US012064897B2

(12) United States Patent
Perez Toneu et al.

(10) Patent No.: US 12,064,897 B2
(45) Date of Patent: Aug. 20, 2024

(54) AUTOMATIC PALLET ASSEMBLY SYSTEM AND METHOD

(71) Applicant: MECANICA CAPE, S.L., Manlleu (ES)

(72) Inventors: Juan Manuel Perez Toneu, Gurb (ES); Carlos Perez Toneu, Manlleu (ES); Marc Perez Toneu, Gurb (ES)

(73) Assignee: Mecanica Cape, S.L., Manlleu (ES)

( * ) Notice: Subject to any disclaimer, the term of this patent is extended or adjusted under 35 U.S.C. 154(b) by 0 days.

(21) Appl. No.: 18/526,711

(22) Filed: Dec. 1, 2023

(65) Prior Publication Data

US 2024/0239006 A1 Jul. 18, 2024

(30) Foreign Application Priority Data

Jan. 17, 2023 (EP) .................................... 23382037

(51) Int. Cl.
*B27M 3/00* (2006.01)

(52) U.S. Cl.
CPC ...... *B27M 3/0073* (2013.01); *Y10T 29/49625* (2015.01); *Y10T 29/53317* (2015.01); *Y10T 29/5397* (2015.01)

(58) Field of Classification Search
CPC ......... Y10T 29/53317; Y10T 29/49625; Y10T 29/5397; B27M 3/0073
See application file for complete search history.

(56) References Cited

U.S. PATENT DOCUMENTS 3,591,067 A * 7/1971 Vial .......................... B27F 7/04 227/100
3,763,547 A * 10/1973 Blakeslee ............ B27M 3/0073 29/430
3,968,560 A * 7/1976 Vial ..................... B27M 3/0073 29/430
4,441,643 A * 4/1984 McCutchen ......... B27M 3/0073 227/152
4,467,951 A * 8/1984 Pagano ................ B27M 3/0073 227/100
5,249,352 A * 10/1993 Landers ............... B27M 3/0073 227/111

(Continued)

FOREIGN PATENT DOCUMENTS

EP 2368679 A1 9/2011
EP 3868530 A1 8/2021
GB 2005181 A 4/1979

*Primary Examiner* — Jermie E Cozart
(74) *Attorney, Agent, or Firm* — Knobbe, Martens, Olson & Bear, LLP

(57) ABSTRACT

A system and method for assembling a pallet with at least two rows of blocks nailed to a board element. Nailing the rows of blocks to the board element includes supplying a first set of at least two blocks at respective supply points, such that the blocks are aligned with one another forming a row, and placing the board element in contact with the blocks, nailing the board element to the blocks located at the respective supply points, moving the assembly of board element and blocks previously nailed to a new nailing position and supplying a second set of at least two blocks at said respective supply points, and nailing together the board element in the new nailing position and the second set of at least two blocks located at the respective supply points.

16 Claims, 10 Drawing Sheets

(56) References Cited

U.S. PATENT DOCUMENTS

| | | | | |
|---|---|---|---|---|
| 5,375,315 | A * | 12/1994 | Griffith | B23P 19/041 29/772 |
| 6,176,009 | B1 * | 1/2001 | Inman | B27M 3/0073 29/772 |
| 2003/0213116 | A1 * | 11/2003 | Smith | B27M 3/0073 29/429 |
| 2007/0108682 | A1 * | 5/2007 | Holliger | B23P 19/041 269/37 |
| 2008/0295708 | A1 * | 12/2008 | Madgar | B27M 3/0073 100/215 |
| 2018/0326612 | A1 * | 11/2018 | Storti | B27F 7/02 |

* cited by examiner

AUTOMATIC PALLET ASSEMBLY SYSTEM AND METHOD

CROSS-REFERENCE TO RELATED APPLICATIONS

The present application claims the priority of European application No. EP23382037.2, titled "AUTOMATIC PALLET ASSEMBLY SYSTEM AND METHOD" and filed Jan. 17, 2023, the disclosure of which is hereby incorporated by reference in its entirety.

BACKGROUND

The present invention relates to methods and machines for the automatic assembly of pallets.

In particular, the present invention relates to the production of block pallets, both skid pallets and perimeter base pallets, in which blocks are connected to a deck. The present invention concerns the nailing of the block to the deck of the pallet.

SUMMARY

The deck of pallets is usually formed of a plurality of flat, elongate boards arranged with their longitudinal axes parallel to one another, forming a flat outer surface of the pallet and a flat inner surface of the pallet. These elements are connected together by means of connection elements, usually also boards, arranged perpendicular to the previous boards along said inner surface. Furthermore, in skid pallets, each skid of the pallet is usually formed of a flat, elongate board connected to one or more prismatic elements or blocks. In the final assembled position, the skids are connected to the deck in such a way that the blocks of said skids are in contact with the connection elements of the deck and parallel to the plurality of flat elements that form the deck of the pallet. In perimeter base pallets, the pallet has an upper deck and a lower deck, with blocks nailed to both decks at the points where the boards of each deck intersect. There are also pallets formed of a deck and blocks connected to said deck, referred to as block pallets. However, the invention is not limited to a specific pallet structure.

All known machines and methods for the production of pallets with blocks have something in common. To move the blocks to the point of assembly use is made of adjustable tools or molds. The molds hold the blocks to be nailed in the positions relative to one another corresponding to the position of the finished pallet. Therefore, the molds must be adjusted to configure the arrangement of the blocks to the size of the pallet to be produced. Usually, the deck is pushed by a pusher positioned in one of the molds/tools or by means of an external pusher. Before the pallet is nailed, pressing means are used to frame the front and side parts of the pallet. These machines are usually made up of a nailing head and a carriage with the molds/tools. EP2368679A discloses a machine of this type. These machines also usually have pressing means at the side and another pressing means at the front to frame the first row of blocks with the deck. They also usually have a system for supplying blocks, back-and-forth or manual.

The known machines and systems have a number of limitations in terms of product quality, production rate and the possibility of changing the operating parameters.

To be specific, having molds/tools to be adjusted involves making changes to the geometry of the pallet to be produced; even when the change affects one of the dimensions (for example the length) this takes a considerable amount of time, since it is necessary to change the geometry of the mold/tool. Furthermore, in order to make geometric changes it is necessary to provide in the machine additional elements to be able to produce pallets with different distances between the blocks of the same row.

Moreover, the use of molds/tools means that pushing a line of blocks requires moving a great weight since the molds/tools must be supported on both sides and/or at their center. This weight slows down movements, owing to the inertia associated with the weight of the mold.

Lastly, the back-and-forth block supply system results in lost time due to the return journeys, and significant movement inertia.

It is an aim of the present invention to disclose methods and machines providing solutions to the abovementioned drawbacks.

More specifically, the present invention discloses a method for assembling a pallet, said pallet comprising at least two rows of blocks nailed to boards of a board element comprising at least two boards, characterized in that the nailing of said rows of blocks to said board element includes the following sequence:

- supplying a first set of at least two blocks at respective supply points, such that the blocks are aligned with one another forming a row, and placing the board element in contact with the blocks;
- nailing the board element to the blocks located at the respective supply points;
- moving the assembly of board element and blocks previously nailed to a new nailing position, and supplying a second set of at least two blocks at said respective supply points;
- nailing together the board element in the new nailing position and the second set of at least two blocks located at the respective supply points.

According to the present invention, the blocks are nailed to a board element such as, for example, a deck with boards, the blocks to be nailed always being located in the same position, corresponding to the supply points. The elements to be nailed ("blocks") are moved to the right position for each nailing operation, whereas the nailing device is not moved between nailing steps. This has two advantages. First, modification of the device performing the method to adapt it to different sizes or types is quick and easy. Second, there is less movement inertia, and therefore assembly is quicker and safer.

Preferably, said blocks are supplied to said supply points using continuous-pitch supply means. The use of continuous-pitch supply means, and more preferably continuous-pitch pushers, to supply the blocks to the supply point for nailing makes it possible to correctly position the block at high speed and easily adapt to different geometries without the use of additional elements. The likelihood of collision between moving parts is also reduced. The supply means may preferably comprise several mutually parallel lines. The lines may each be motorized individually or share the same motor. The lines may have a number of pushers or a single shared pusher.

Also preferably, the assembly of board elements and blocks previously nailed is moved by a continuous-pitch kinematic device. This kinematic device has the function of moving the board element between each nailing operation, placing it in the right position.

The continuous-pitch supply means and kinematic devices facilitate correct positioning of the blocks and/or the board element at their point of nailing, with a high speed of advance and without the need for additional and/or bulky elements. Thanks to their small volume, mass and adapted travel, the inertia of the elements in motion is minimized, as is damage in the event of snagging or collision between elements.

Preferably, the blocks and board element are framed before each nailing step.

In the present invention, "framing" means the action of aligning the elements using pressure exerted by external elements, whether these are active or passive. Framing has the purpose of ensuring optimal positioning of the blocks, in particular laterally. In preferred embodiments, the lateral direction is perpendicular to the advance of the blocks and the board element, and therefore slight adjustment of the position in said position is recommended. It is also recommended to adjust the position of the board element. For the blocks close to the perimeter of the pallet to be assembled, it is also recommended to carry out framing in the perimeter direction (front and rear). This ensures correct alignment of blocks and the board element around the whole perimeter of the pallet.

Preferably, framing involves pressing the blocks located at their respective supply positions in opposite directions in a direction parallel to that of the row formed by said blocks. More preferably, this framing also comprises exerting pressure on the board element in said parallel direction. Even more preferably, this framing also comprises exerting pressure on the blocks and/or on the board element in a direction perpendicular to said parallel direction.

In one particularly preferred embodiment, for the first row of blocks of the pallet, framing consists in exerting lateral pressure in said parallel direction and front pressure in said perpendicular direction, and for the last row of the pallet, framing consists in exerting lateral pressure in said parallel direction and rear pressure in said parallel direction. More preferably, the pallet comprises at least one intermediate row between the first and last rows, and framing of said at least one intermediate row consists in exerting pressure in said perpendicular direction.

Preferably, in each nailing operation all of the blocks corresponding to a given row of blocks of the pallet to be assembled are nailed to the board element.

Preferably, the board element may be the deck of the pallet.

Preferably, the method comprises a prior step of continuous feeding of blocks to a device that supplies, as mentioned, a first set of at least two blocks.

As is clear from the above, the present invention also discloses an automatic pallet assembly system for assembling pallets following a method according to the present invention, characterized in that it comprises:

- a supply means for supplying at least two blocks to respective supply points, such that the blocks are aligned with one another forming a row;
- a conveyor element for moving a board element of the pallet into a first nailing position in which the board element is in contact with the blocks located at said supply points;
- a nailer device for nailing the blocks at the respective supply points to the pallet in a first nailing position,
- in that the conveyor element has the capacity to move the board element and said blocks previously nailed to the board element to a second nailing position, in which at least the board element is in contact with at least two additional blocks located at said respective supply points.

Preferably, the supply means is a continuous-pitch supply means. Also preferably, the continuous-pitch supply means comprises at least two parallel conveyors that convey said blocks to said supply points. More preferably, each conveyor comprises separators arranged at regular intervals for pushing the blocks towards the supply points.

Advantageously, the system may comprise a mechanism for feeding blocks to the block supply means. The feed mechanism may comprise a clamp, rollers and/or chains for pushing blocks located at the start of each of said conveyors.

In one particularly preferred embodiment, the block feed mechanism is a continuous block feed mechanism making it possible to adapt to any difference in length of the block in the configuration of the pallet. Preferably, the continuous block feed system comprises pairs of mechanical elements that grip a block laterally to feed the continuous-pitch supply means, which preferably may comprise a number of linear conveyors positioned parallel to one another, the linear conveyors preferably having separators distributed at regular intervals.

Preferably, the assembly system comprises a framing device for pressing the blocks to be nailed located at the respective supply points and the board element. Preferably, the framing device may comprise electromechanical or pneumatic actuators or passive elements.

Preferably, the framing device comprises electromechanical and/or pneumatic actuators. Also preferably, the framing device comprises passive elements that oppose the action of said actuators.

In one particularly preferred embodiment, the framing device has means for exerting pressure on the blocks in a direction parallel to that of the row formed by the blocks located at the supply points and means for exerting pressure on the blocks in a direction perpendicular to said parallel direction.

Preferably, the framing device has means for exerting pressure differently on the blocks depending on the row of the pallet to be nailed.

These and other advantages and features of the invention will become clear from the figures and the detailed description of the invention. Said figures should be understood as an explanatory but non-limiting example of an embodiment of the assembly system according to the present invention.

DETAILED DESCRIPTION

Figure 1:
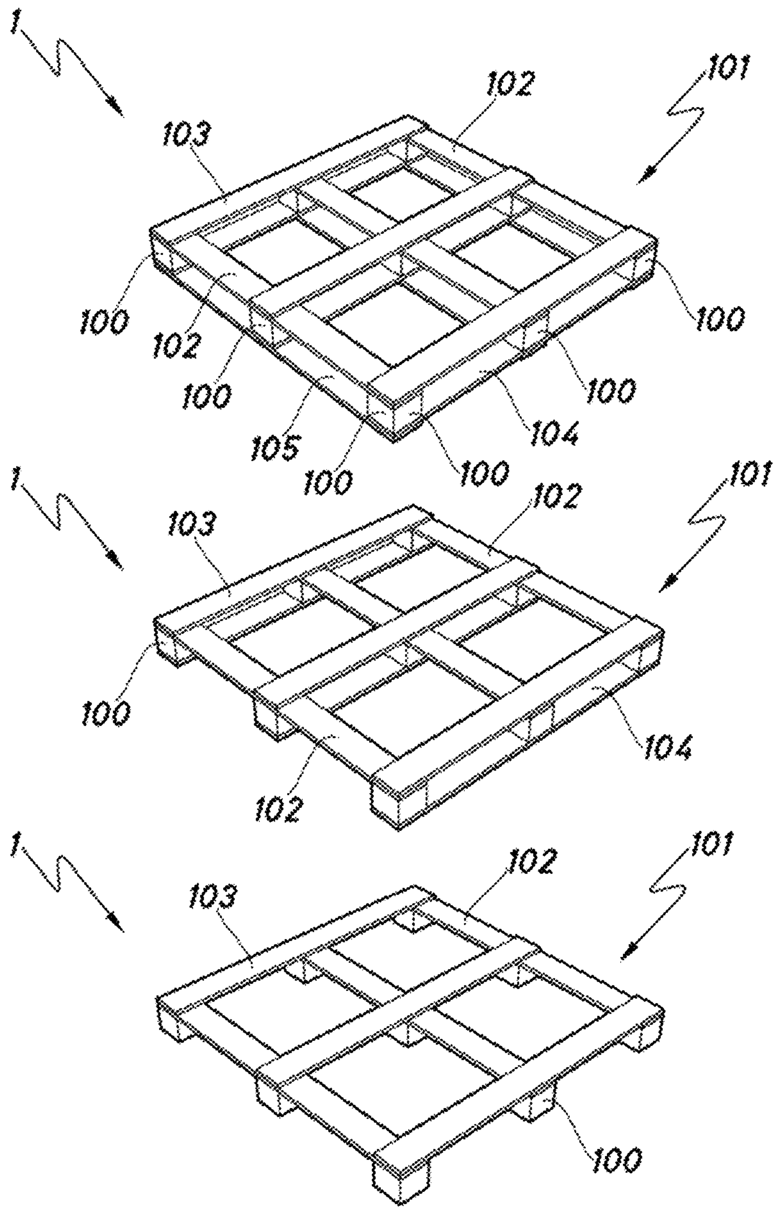
FIG. 1 shows three different types of block pallets, which may be produced according to the present invention.

FIG. 1 shows three examples of block pallets 1 that may be produced according to the present invention. Other types of pallets may also be produced according to the present invention.

In the three examples shown in FIG. 1, a number of blocks 100 are connected to board elements. The top example shown in FIG. 1 is a perimeter base pallet in which the blocks are connected to respective decks composed of a grid of boards. The upper deck 101 is formed of longitudinal boards 103 and transverse boards 102, while the lower deck is also formed of longitudinal boards 104 and transverse boards 105. In the middle example, the pallet 1 is a skid pallet. At the top, the blocks 100 are nailed to an upper deck 101 formed of longitudinal boards 103 and transverse boards 102. At the bottom, the blocks 100 are connected to a board element formed of longitudinal boards 104 parallel to one another. The lower longitudinal boards 104 in this type of pallet are not connected to one another, but each one is nailed independently to a row of blocks 100. In the bottom example, the blocks 100 are connected to an upper deck 101 formed of longitudinal boards 103 and transverse boards 102.

Figure 2:
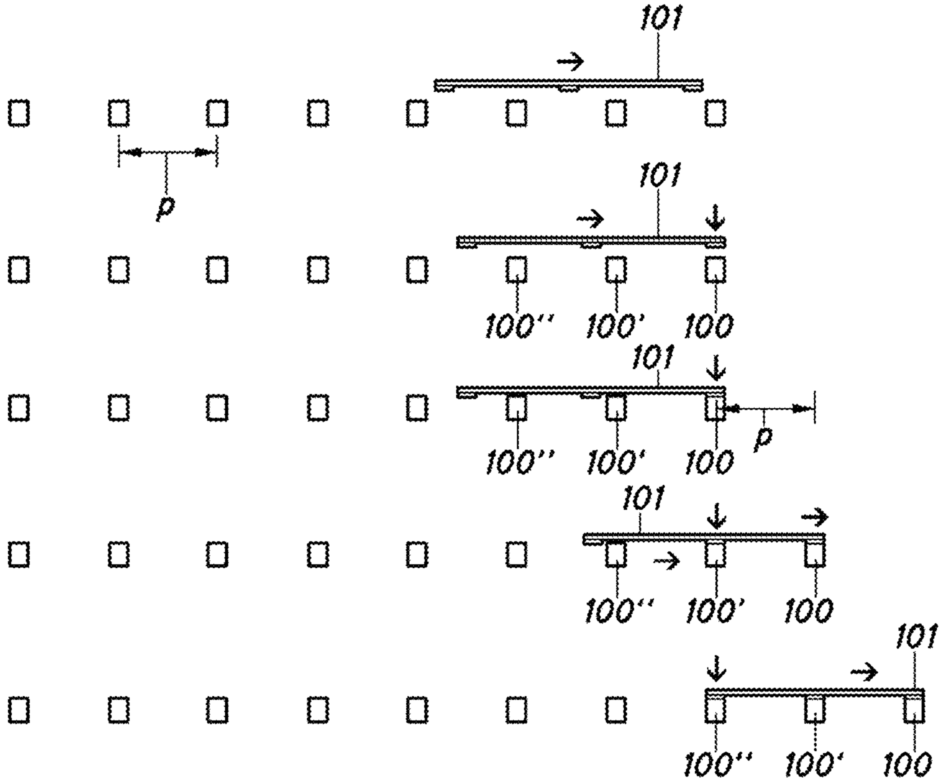
FIG. 2 schematically shows various phases of nailing blocks to a board element following a method according to the present invention.

FIG. 2 shows, schematically, a nailing method according to the present invention. This figure depicts five moments in the process of nailing blocks 100, 100', 100" to a deck 101. Each moment is depicted as a line, sequentially, such that the first moment is the top row and the last moment is the bottom row. In the figures, for explanatory reasons, only one row of blocks 100, 100', 100" has been shown. However, note that the process may be performed simultaneously for several or all the lines of blocks included in the pallet.

As shown in the top line of FIG. 2, a row of blocks 100, 100', 100" is laid out, separated by a constant pitch p. The last block 100 is at the block supply point. A deck 101 is moved until the area of the deck 101 to be connected to the block 100 is aligned with the block 100. Having reached this position, shown in the second line of FIG. 2, the deck 101 is placed in contact with the block 100 to be nailed, and nailing then takes place (third line). Once nailing has taken place, the line of blocks 100', 100" is advanced by one pitch p (see fourth line). The block 100 advances together with the deck 101, the advance being determined by the size of the pallet. This means that the second block 100' occupies the supply position formerly occupied by the first block 100, and also that the deck 101 is in the right position for nailing of the second block 100' to the deck 101 in the right place. Once the second block 100' has been nailed, the blocks are again moved by one pitch p and the deck nailed to the block 100 and 100' is advanced, which brings the third block 100" into the supply position and the deck 101 into the right position for nailing of the third block 100" to the deck 101. If the process shown in FIG. 2 is performed simultaneously for all the rows of blocks of the pallet, the result is an assembly made up of a deck 101 and blocks 100, 100', 100" which may be used as a pallet or as an intermediate product for a skid pallet or perimeter base pallet, in which case the lower boards or deck would then be nailed on, preferably following a method similar or identical to that shown.

With the method shown, movements of mechanical elements are reduced. The blocks may be supplied continuously without the need for any clamp or mechanical element to be inserted between molds. There is therefore no time lost as the elements inserted retract. The risk of collision between moving elements is also eliminated.

Figure 3:
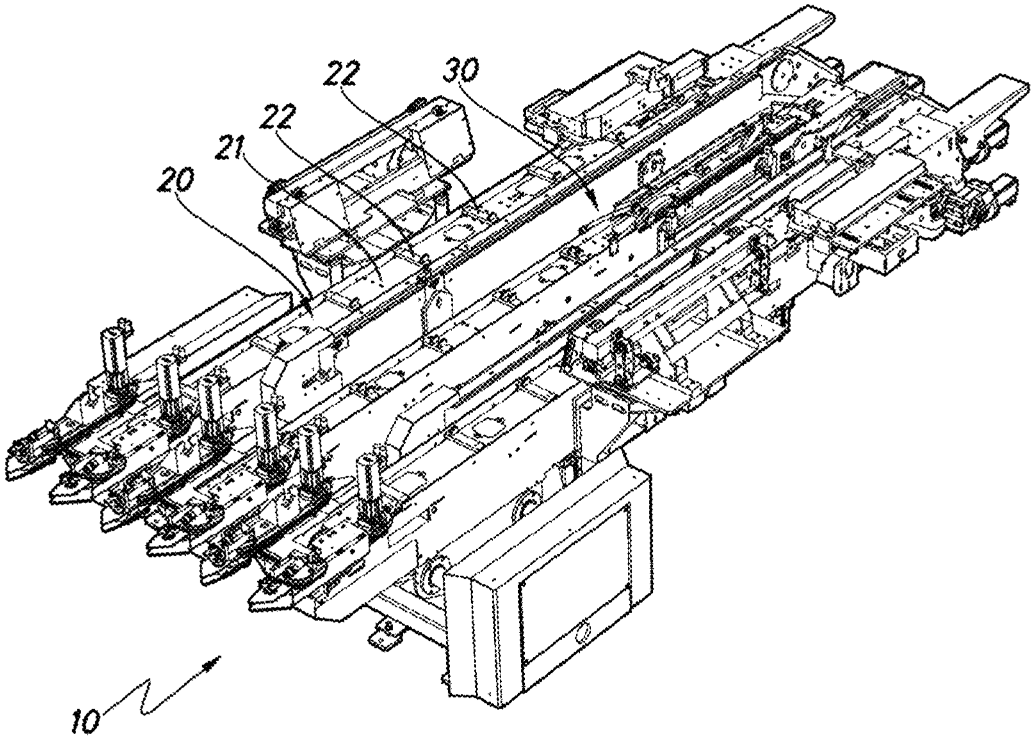
FIG. 3 is a perspective view of a nailing machine for producing pallets according to the present invention.

FIG. 3 shows an embodiment of a machine according to the present invention. This figure depicts a module 10 for continuous feeding of blocks, a module 20 for supplying blocks with several supply lines, and a module 30 for supplying decks. FIG. 3 shows various elements of the module 20 for supplying blocks, which in this case comprises a number of conveyors 21 in parallel. More specifically, in this example there are three conveyors 21, each conveyor corresponding to a block of each row of blocks making up the pallet to be assembled. Each conveyor 21 has separators 22 arranged at regular intervals. Specifically, the distance between separators 22, in the example, determines the pitch p.

Figure 4:
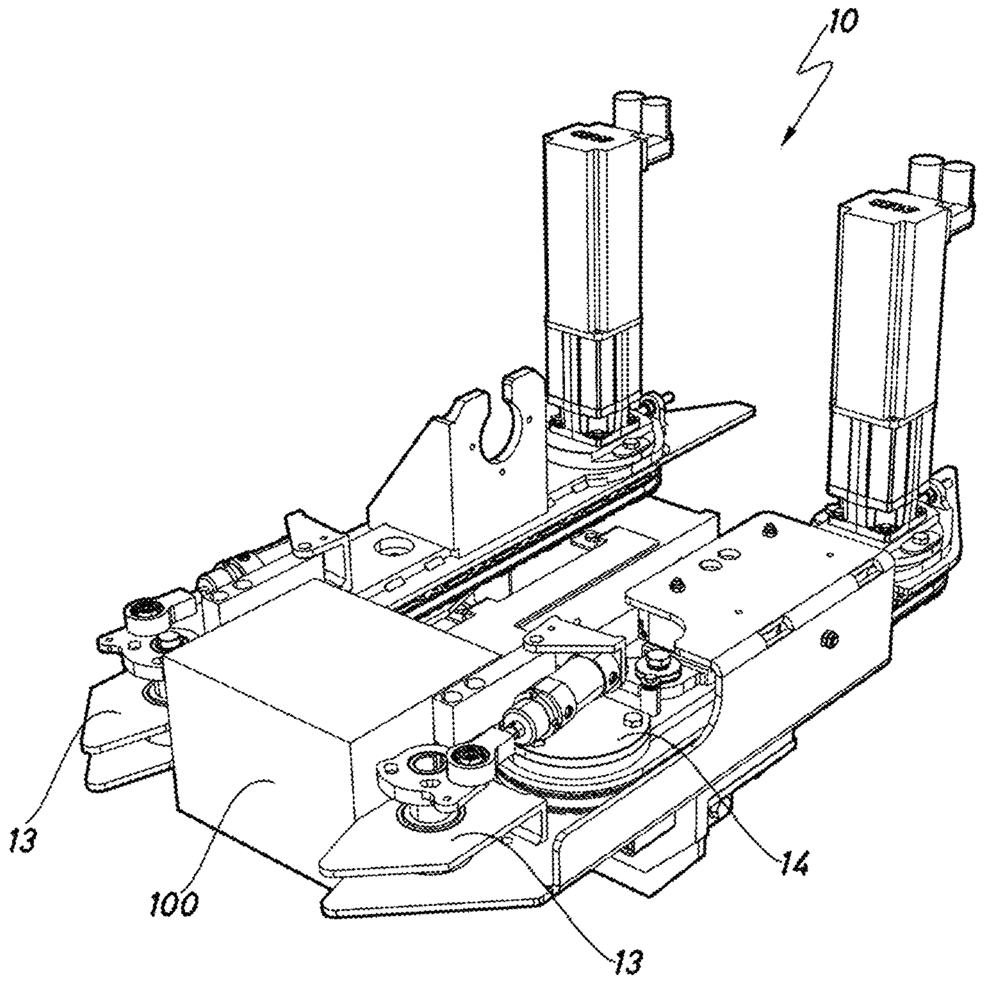
FIG. 4 shows, in perspective, a module for continuous feeding of blocks to the block supply means of the machine of FIG. 3.

FIG. 4 shows, in detail, the module 10 for feeding blocks. By means of a system for pressing laterally on the blocks 100, the blocks are moved so as to be supplied continuously. In particular, the device shown has a clamp 13 that exerts said lateral pressure, and motorized wheels or chains 14 that push the block towards the supply module. In operation, the clamps 13 receive a block 100 and the motorized wheel (or chain) pushes the block 100 towards the supply module (not shown in FIG. 4). Delivery to the supply module takes place at regular intervals, depending on the speed of conveying of blocks of the supply module, such that the blocks 100 are delivered to the supply module spaced apart by a predetermined fixed pitch. Delivery to each of the conveyors 21 of the supply module preferably takes place simultaneously, such that the blocks delivered simultaneously form a row.

Figure 5:
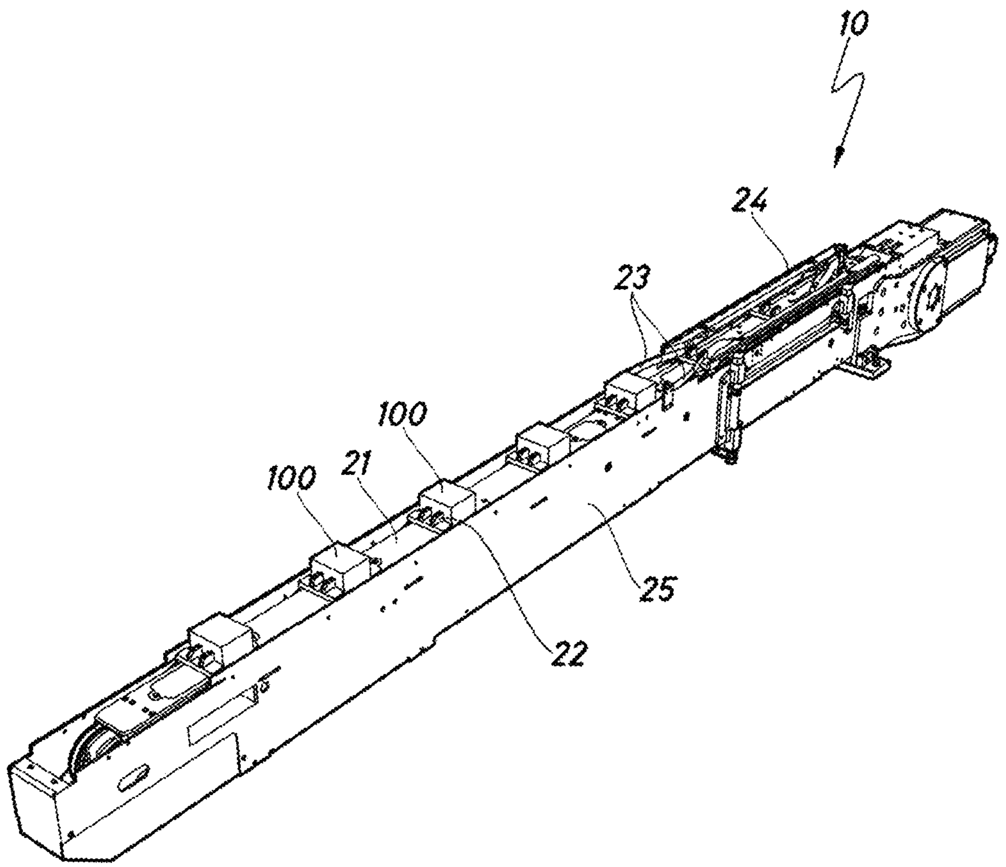
FIG. 5 is a perspective view of the pallet supply means of the machine of FIG. 3.

FIG. 5 shows a line of the module 10 for supplying blocks 100, made up of a conveyor 21, with separators 22. Each pair of separators 22 defines a space for a block 100. In this embodiment, the distance between separators 22 is fixed and does not need to be adjusted at any time. The separators 22 push the blocks 100 and are programmed to place the block to be nailed at the programmed point. During conveying, the separators 22 push the blocks 100, ensuring the position within the space between separators 22. Before delivery to the supply position, there is a flexible clamp 23 having the function of ensuring correct orientation of the block, which could have turned over as it was being conveyed, and a guide 24 for maintaining the correct orientation just before arrival at the supply point to which the conveyor 21 has not yet advanced the block 100.

One advantage of the separators 22 pushing the blocks with respect to the molds of the prior art is that the molds have to be adjusted for each position of a block within the pallet and for each size of block and pallet, which may require the use of additional elements for the adjustment. The pusher shown is a fixed-pitch moving means. One advantage of using fixed-pitch moving means is that it allows a higher conveying speed, casier changing of the format of the pallet to be produced and independent positioning of each block in the optimal position for nailing the block to the deck. Moreover, the movement inertia associated with fixed-pitch moving means is low, allowing better positioning and reducing the likelihood of damage to elements owing to snagging between components.

Figure 6:
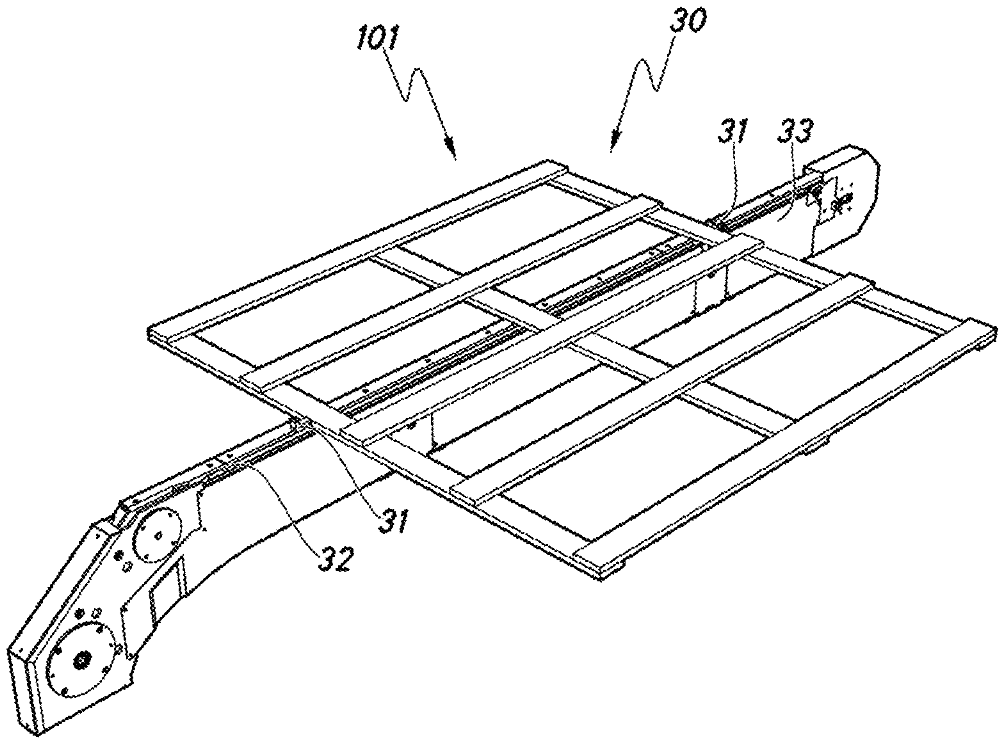
FIG. 6 is a perspective view of the deck supply module of the machine of FIG. 3.

FIG. 6 shows one of the lines of the module 30 for supplying decks. This module 30 comprises at least one conveyor 33, for example a motorized chain conveyor (not visible in the figure) having the function of placing the deck in the correct position for nailing. In the machine in this example, the module 30 comprises two conveyors 33 like that shown in FIG. 6, which are arranged parallel to the conveyors of the module for supplying blocks. The deck 101 is secured by two securing means 31. The module does not require physical changes in configuration if the geometry of the pallet changes. Using an electronic control, the deck is positioned in the correct location for the first and subsequent nailing steps. Once the first row of blocks has been nailed, the conveyors 33 have the role of moving the product until the finished product is obtained.

FIGS. 7 to 10 illustrate the process of assembly of FIG. 2, performed in the machine shown in FIG. 3. Identical, similar or equivalent elements have been designated using the same numerals and will not be explained in detail.

Figure 7:
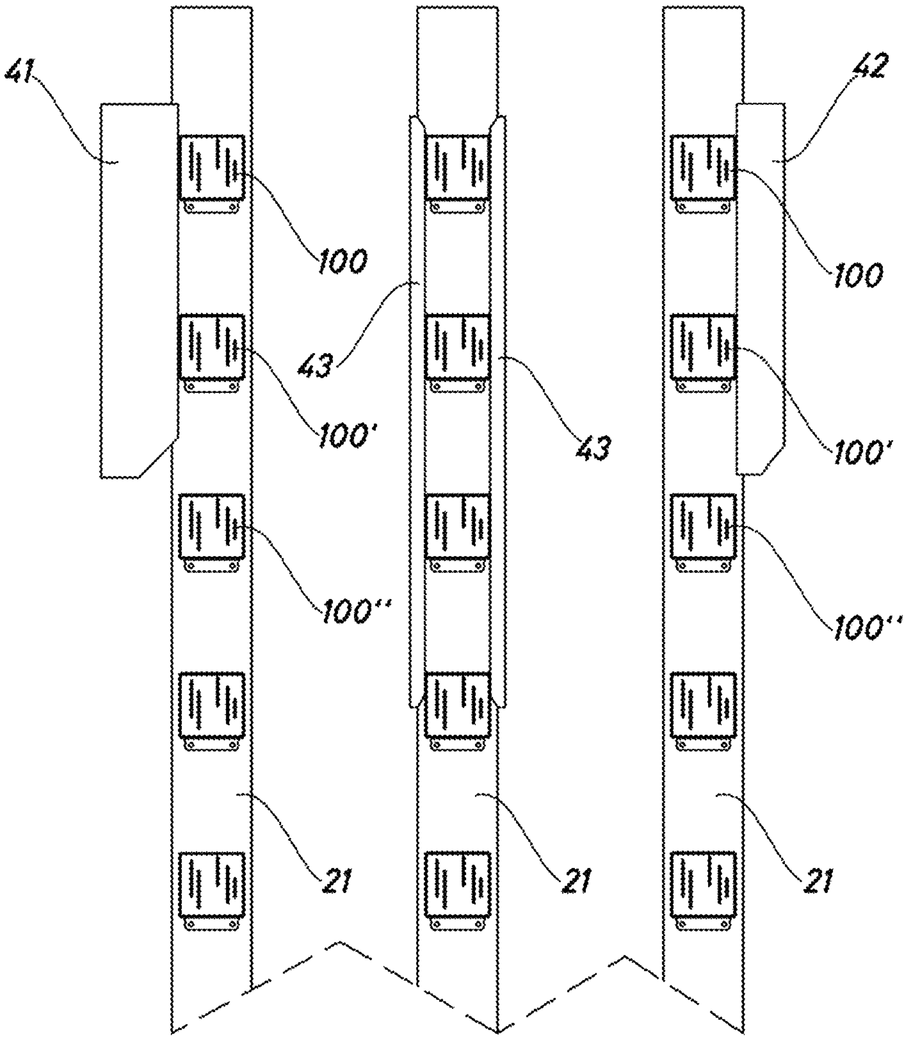
FIG. 7 shows, schematically, a first moment in the supply of the blocks to be assembled.

FIG. 7 shows a first moment in the assembly process. Each conveyor 21 moves a number of blocks 100, 100', 100" spaced apart at a fixed pitch. Moreover, in the example shown, the blocks are conveyed simultaneously, such that the blocks on different conveyors 21 form rows perpendicular to the direction of movement. To sum up, the conveyors 21 convey a row of first blocks 100 to their respective supply positions, which are aligned.

Figure 8:
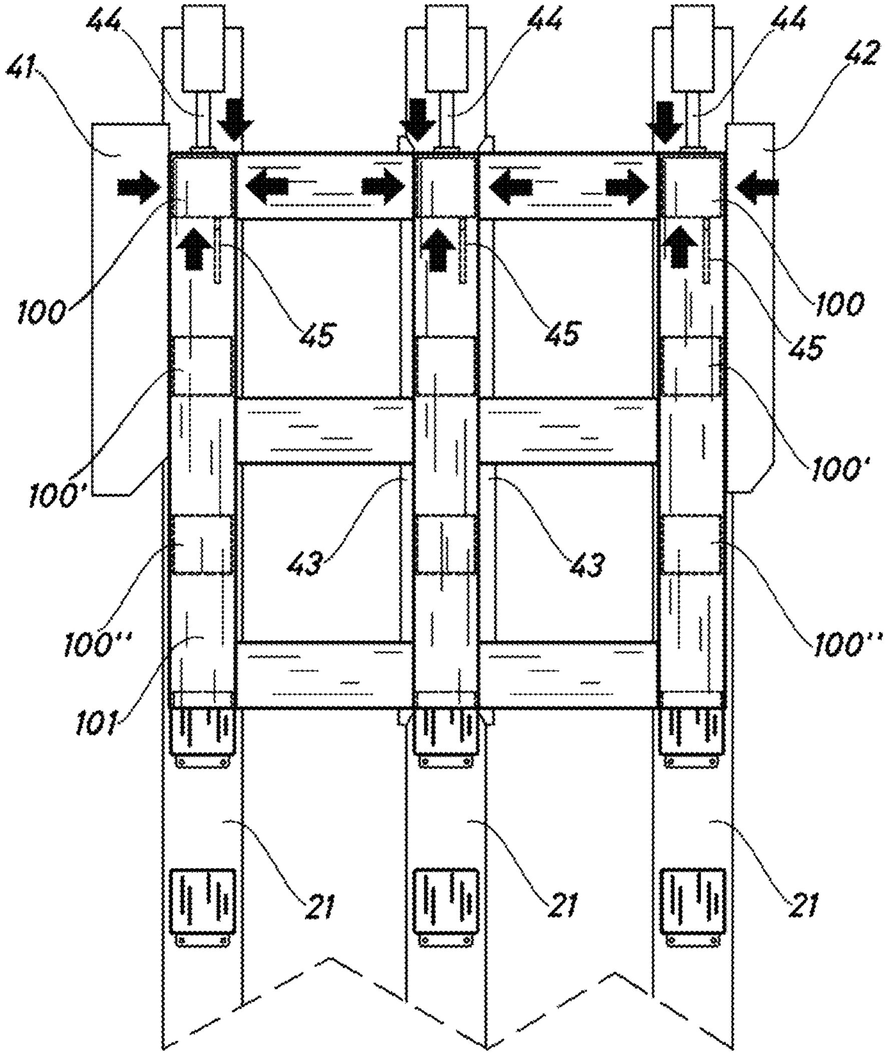
FIG. 8 shows, schematically, a first moment in the method for assembling the blocks of a pallet, in which a front line of blocks is nailed ("front nailing").
Figure 9:
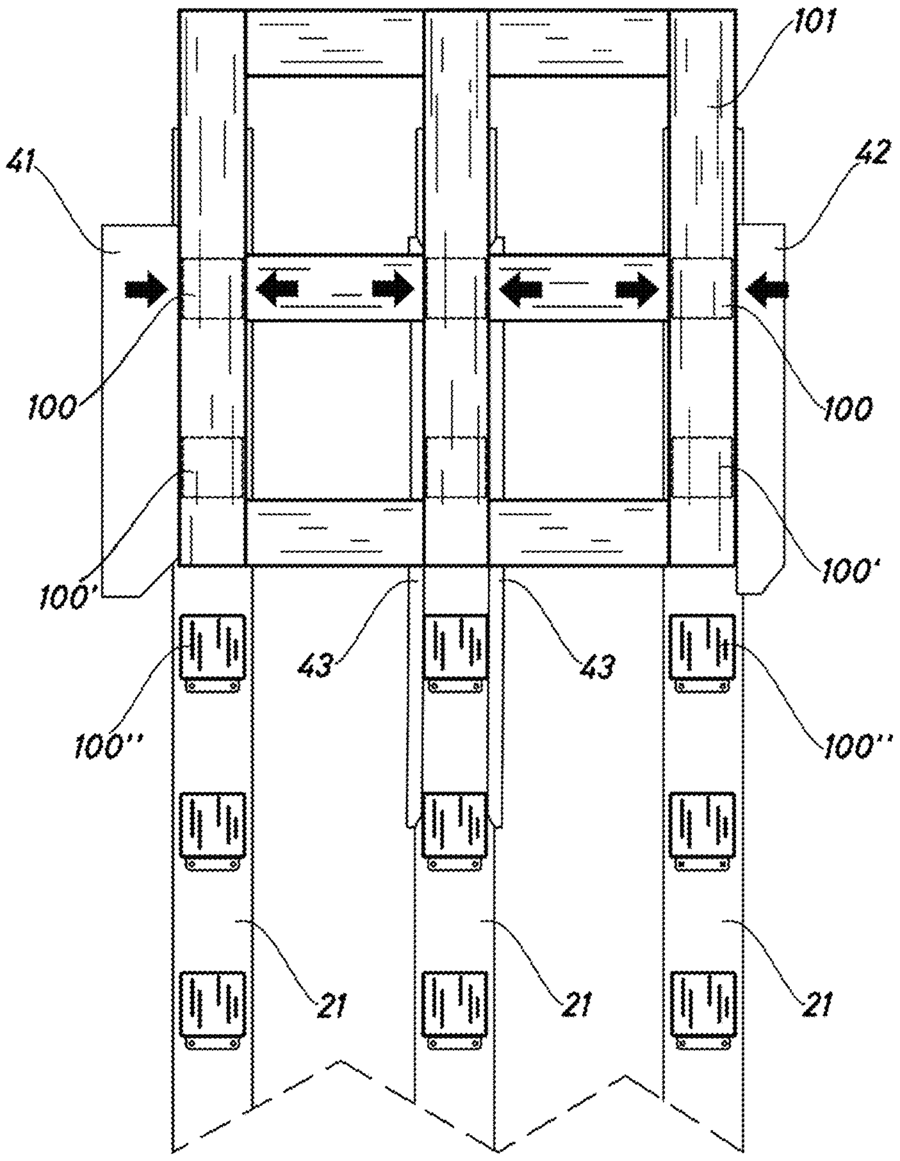
FIG. 9 shows, schematically, a first moment in the method for assembling the blocks of a pallet, in which an intermediate line of blocks is nailed ("intermediate nailing").

In this position, the deck 101 is placed in the nailing position, reaching the position shown in FIG. 8. In said position, the blocks 100 are framed in their nailing position. The active framing directions in the example have been indicated with black arrows. The blocks under the deck 101 have been shown in discontinuous lines. Framing is performed by pressing the blocks. The deck may also be pressed, if desired. The framing elements may be active or passive. In the figures, the active elements have been designated using the numerals 43, 44 and 45 and the passive elements have been given the numerals 41 and 42. For the sake of clarity, not all of the elements required for framing have been physically depicted. The directions in which pressure is exerted on the blocks 100, 100', 100" have been indicated with black arrows.

Framing makes it possible to obtain a high quality pallet. Thanks to framing, the blocks are held in the correct position for nailing. Framing seeks to align the deck laterally, and/or to the front and/or to the rear, as required in each nailing operation. Said framing is carried out using electromechanical and/or pneumatic actuators that may be of various types. The actuators perform opposite actions on opposite faces of the block. It is also possible to combine passive elements (stops) with mixed actuators, combining their action to exert pressure on the blocks and/or the deck. The actuators may, for example, be hydraulic or pneumatic fingers 44, 45 that can move and that press on the blocks 100. In the first nailing step (corresponding to the position of FIG. 8), the blocks and the deck are framed by pressing on the front part and the side. Lateral framing is also carried out to ensure correct positioning of the deck and the block laterally. The central block is framed on both sides, by means of a framer actuated mechanically (not shown in the figures), allowing correct centering of the block with the pallet. Optionally, framing may also be carried out at the rear of the blocks 100 using fingers 45, which move from a lower position, in which they do not interfere with the movement of the block, into an active position in which they press on the block via a rear face.

Once framing is complete, nailing of the blocks 100 and deck 101 takes place.

After nailing, the deck 101 with the blocks 100 recently nailed and the blocks 100', 100" still on the conveyors 21 are moved independently. The second row of blocks 100' arrives at the supply points that were occupied by the blocks 100 previously nailed, and the deck moves until the areas where the second row of blocks is to be nailed are above the blocks 100' at the supply points, reaching the position shown in FIG. 9. In this position (and in the positions corresponding to intermediate rows of blocks, if the pallet has more than three rows), preferably, framing is carried out for aligning the block 100' with the side of the deck 101. During this intermediate nailing step, only lateral framing is carried out. Following framing, nailing is carried out, after which the elements (blocks 100" and deck 101) are again moved until they reach the position of FIG. 10.

Figure 10:
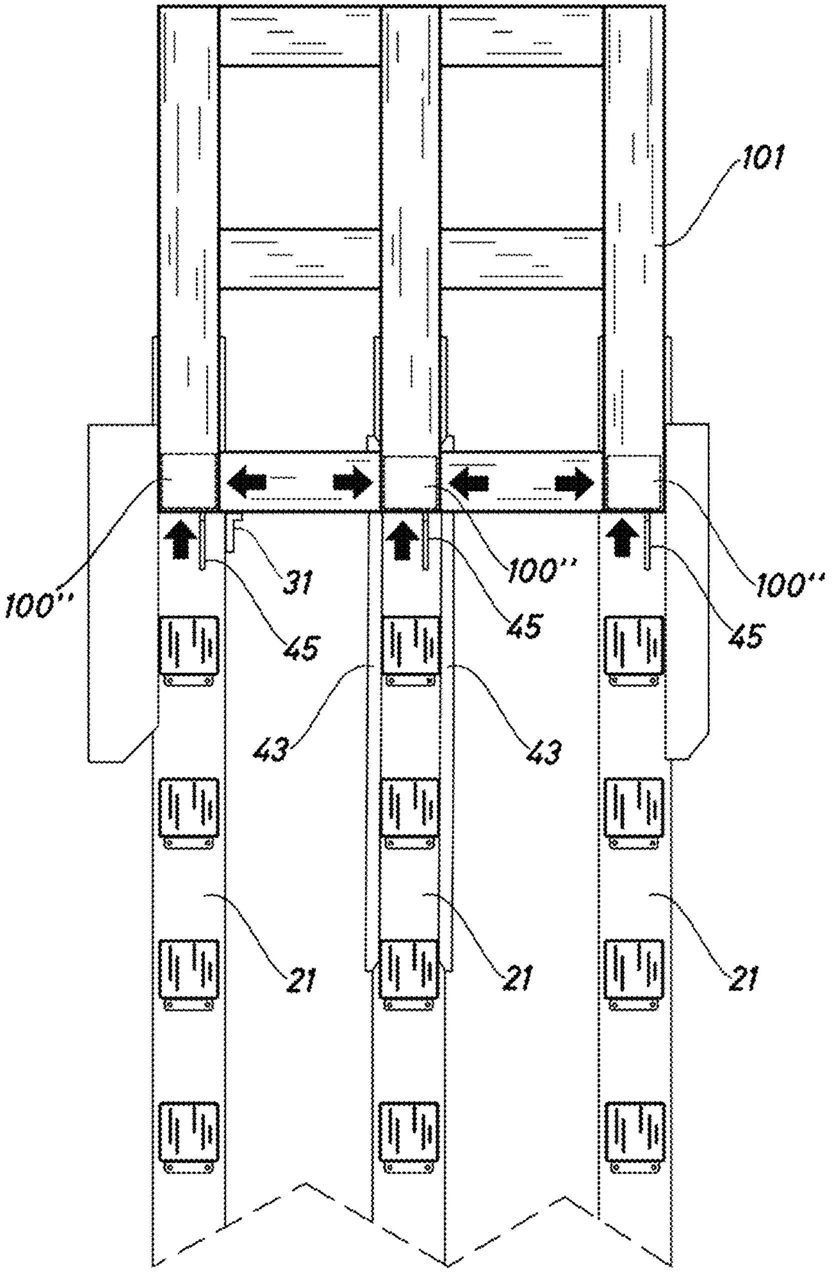
FIG. 10 shows, schematically, a first moment in the method for assembling the blocks of a pallet, in which a last line of blocks is nailed ("last nailing").

The position of FIG. 10 corresponds to nailing of the last row of blocks 100". During the last nailing step, it is advantageous to align the block with the rear part of the deck and with the side. To align the rear part, use is made of the hydraulic or pneumatic fingers 45, which access the rear part of the blocks from a point below the latter, and the lateral framing elements. In particular, FIG. 10 shows one of the lateral pressing elements, designated with the numeral 31.

Although the invention has been described in relation to a preferred embodiment, this should not be considered as limiting the invention, and it is possible to change structural or other types of details which may be obvious to a person skilled in the art after interpreting the subject matter disclosed in the present description, claims and drawings. In particular, in principle and unless explicitly cited, all the features of the various embodiments and alternatives shown and/or suggested may be combined. Therefore, the protection of the present invention includes any variant or equivalent that could be considered to be covered by the broadest interpretation of the following claims.

What is claimed is:

1. A method for assembling a pallet, the pallet comprising at least two rows of blocks nailed to a board element comprising at least two boards, wherein nailing of the at least two rows of blocks to the board element comprises:

supplying a first set of the at least two blocks at respective supply points, such that the first set of blocks are aligned with one another forming a row;

placing the board element in contact with the first set of the at least two blocks;

nailing the board element to the first set of the at least two blocks located at the respective supply points to form a nailed assembly;

moving the nailed assembly of the board element and the first set of the at least two blocks to a new nailing position;

supplying a second set of the at least two blocks at the respective supply points; and nailing the board element in the new nailing position with the second set of the at least two blocks located at the respective supply points.

2. The method according to claim 1, wherein the blocks are supplied to the respective supply points using continuous-pitch supply means.

3. The method according to claim 1, wherein the nailed assembly of the board element and the blocks is moved by a continuous-pitch kinematic device.

4. The method according to claim 3, wherein the continuous-pitch kinematic device comprises at least one conveyor and at least one clamp.

5. The method according to claim 1, wherein the blocks and the board element are framed before each nailing step.

6. The method according to claim 1, wherein the board element further comprises a deck of the pallet.

7. The method according to claim 1, further comprising continuously feeding the blocks to a device that supplies the first set of the at least two blocks.

8. A system for automatically assembling pallets according to the method of claim 1, the system comprising:

a supply means for supplying the first set of the at least two blocks to the respective supply points, such that the first set of blocks are aligned with one another forming the row; and a conveyor element for moving the board element of the pallet into a first nailing position in which the board element is in contact with the first set of blocks located at the respective supply points;

wherein the first set of blocks are nailed at the respective supply points to the pallet in the first nailing position, wherein the conveyor element is configured to move the board element and the first set of blocks nailed to the board element to a second nailing position, wherein in the second nailing position, the board element is in contact with at least two additional blocks located at the respective supply points.

9. The system according to claim 8, wherein the supply means is a continuous-pitch supply means.

10. The system according to claim 9, wherein the continuous-pitch supply means comprises at least two parallel conveyors that convey the blocks to the respective supply points.

11. The system according to claim 8, wherein each conveyor element further comprises separators arranged at regular intervals for pushing the blocks towards the respective supply points.

12. The system according to claim 8, further comprising a feed mechanism for feeding blocks to the supply means.

13. The system according to claim 12, wherein the feed mechanism comprises a clamp and rollers or chains for pushing blocks located at a start of the conveyor element.

14. The system according to claim 8, further comprising a framing device for pressing the blocks to be nailed located at the respective supply points and the board element, the framing device comprising electromechanical or pneumatic actuators or passive elements.

15. The system according to claim 14, wherein the framing device comprises means for exerting pressure on the blocks in a first direction parallel to that of the row formed by the blocks located at the respective supply points and means for exerting pressure on the blocks in a second direction perpendicular to the first direction.

16. The system according to claim 14, wherein the framing device comprises means for exerting pressure differently on the blocks depending on the row of the pallet to be nailed.

* * * * *